(12) United States Patent
Shan et al.

(10) Patent No.: US 12,216,598 B2
(45) Date of Patent: Feb. 4, 2025

(54) FIELD PROGRAMMABLE GATE ARRAY (FPGA) FOR IMPLEMENTING DATA TRANSMISSION BY USING BUILT-IN EDGE MODULE

(71) Applicant: WUXI ESIONTECH CO., LTD., Wuxi (CN)

(72) Inventors: Yueer Shan, Wuxi (CN); Yanfeng Xu, Wuxi (CN); Jicong Fan, Wuxi (CN); Tong Liu, Wuxi (CN); Hua Yan, Wuxi (CN)

(73) Assignee: WUXI ESIONTECH CO., LTD., Wuxi (CN)

( * ) Notice: Subject to any disclaimer, the term of this patent is extended or adjusted under 35 U.S.C. 154(b) by 0 days.

(21) Appl. No.: 18/347,642

(22) Filed: Jul. 6, 2023

(65) Prior Publication Data

US 2023/0359573 A1    Nov. 9, 2023

Related U.S. Application Data

(63) Continuation of application No. PCT/CN2023/082990, filed on Mar. 22, 2023.

(51) Int. Cl.
*G06F 13/20* (2006.01)
*G06F 12/0802* (2016.01)

(52) U.S. Cl.
CPC .......... *G06F 13/20* (2013.01); *G06F 12/0802* (2013.01); *G06F 2212/60* (2013.01); *G06F 2213/40* (2013.01)

(58) Field of Classification Search
CPC .. G06F 13/20; G06F 12/0802; G06F 2212/60; G06F 2213/40
See application file for complete search history.

(56) References Cited

U.S. PATENT DOCUMENTS 6,081,473 A    6/2000 Agrawal et al.

FOREIGN PATENT DOCUMENTS

| CN | 1988501 A | 6/2007 |
|---|---|---|
| CN | 102999467 A | 3/2013 |

(Continued)

OTHER PUBLICATIONS

Translation of CN-111340835-A (Year: 2020).*
Translation of CN-115829823-A (Year: 2023).*
Translation of TW-202345011-A (Year: 2023).*

*Primary Examiner* — Henry Tsai
*Assistant Examiner* — John B Roche
(74) *Attorney, Agent, or Firm* — Bayramoglu Law Offices LLC

(57) ABSTRACT

An FPGA for implementing data transmission by using a built-in edge module is provided. The FPGA is provided with a built-in edge module. A read port of each resource module connected to the edge module in the FPGA is separately connected to a winding architecture and the edge module, and/or a write port of each resource module connected to the edge module in the FPGA is separately connected to the winding architecture and the edge module. The edge module includes a read/write controller and a cache unit. The read/write controller simultaneously reads data from read ports of a plurality of resource modules and temporarily stores the read data in the cache unit. Alternatively, the read/write controller simultaneously writes temporarily stored data in the cache unit into write ports of the plurality of resource modules.

14 Claims, 4 Drawing Sheets

(56) References Cited

FOREIGN PATENT DOCUMENTS

| | | | | |
|---|---|---|---|---|
| CN | 103593315 A | | 2/2014 | |
| CN | 109902040 A | | 6/2019 | |
| CN | 111158633 A | | 5/2020 | |
| CN | 111340835 A | * | 6/2020 | ............... G06T 1/60 |
| CN | 111984563 A | | 11/2020 | |
| CN | 115829823 A | * | 3/2023 | |
| TW | 202345011 A | * | 11/2023 | ............. G06F 13/36 |

* cited by examiner

FIELD PROGRAMMABLE GATE ARRAY (FPGA) FOR IMPLEMENTING DATA TRANSMISSION BY USING BUILT-IN EDGE MODULE

CROSS REFERENCE TO THE RELATED APPLICATIONS

This application is a continuation application of International Application No. PCT/CN2023/082990, filed on Mar. 22, 2023, which is based upon and claims priority to Chinese Patent Application No. 202211622755.6, filed on Dec. 16, 2022, the entire contents of which are incorporated herein by reference.

TECHNICAL FIELD

The present disclosure relates to the field of field programmable gate arrays (FPGAs), and in particular, to an FPGA for implementing data transmission by using a built-in edge module.

BACKGROUND

An FPGA internally contains a large quantity of resource modules such as a configurable logic block (CLB), a block random access memory (BRAM), a digital signal processor (DSP), and an input/output box (JOB). These resource modules achieve signal interconnection based on a winding architecture to achieve a required user design. In recent years, artificial intelligence (AI) applications, communication signal processing, and other fields have put forward a higher performance requirement for a computing capability and speed of the FPGA. Therefore, how to achieve high-speed data transmission has become a technical focus in a development process of a high-capacity FPGA.

SUMMARY

Technical Problems

In recent years, AI applications, communication signal processing, and other fields have put forward a higher performance requirement for a computing capability and speed of an FPGA. Therefore, how to achieve high-speed data transmission has become a technical focus in a development process of a high-capacity FPGA.

Technical Solutions

To resolve the above problems and meet the above technical requirements, the inventor of the present disclosure proposes an FPGA for implementing data transmission by using a built-in edge module. The technical solutions of the present disclosure are as follows:

An FPGA for implementing data transmission by using a built-in edge module is provided with a built-in edge module connected to a plurality of resource modules within the FPGA, where a read port of each of the plurality of resource modules is separately connected to a winding architecture and the edge module, and/or a write port of each of the plurality of resource modules is separately connected to the winding architecture and the edge module; and the edge module includes a read/write controller and a built-in cache unit, where the read/write controller simultaneously reads data from read ports of the plurality of resource modules and temporarily stores the read data in the cache unit, or the read/write controller simultaneously writes temporarily stored data in the cache unit into write ports of the plurality of resource modules.

As a further technical solution, the built-in cache unit of the edge module includes a plurality of read cache units and at least one write cache unit, where the data simultaneously read by the read/write controller from the read ports of the plurality of resource modules is temporarily stored in the plurality of read cache units respectively, and each of the plurality of read cache units is configured to temporarily store data read from a read port of one resource module; and the data simultaneously written by the read/write controller into the write ports of the plurality of resource modules comes from the at least one write cache unit, and data in each of the at least one write cache unit is simultaneously written into a write port of at least one resource module.

As a further technical solution, the resource module connected to the edge module has both a read port and a write port, and the read/write controller simultaneously reads data from a read port of one resource module and writes data into a write port of the one resource module.

As a further technical solution, each of the plurality of built-in read cache units of the edge module is separately connected to read ports of a plurality of resource modules, a read port of each of the plurality of resource modules is connected to the corresponding read cache unit by using a three-state selector, and the read/write controller controls on/off of each three-state selector and reads data from a read port of one of the plurality of resource modules connected to the read cache unit each time; and each of the at least one built-in write cache unit of the edge module is separately connected to write ports of a plurality of resource modules, and the read/write controller writes data in one write cache unit into write ports of all connected resource modules or into write ports of some connected resource modules each time.

As a further technical solution, each of the plurality of built-in read cache units of the edge module is separately connected to the at least one write cache unit, data written by the read/write controller into a write port of any first resource module is data read by the read/write controller from a read port of another second resource module, the read/write controller reads the data from the read port of the second resource module and temporarily stores the read data in a read cache unit connected to the read port of the second resource module, and the read/write controller writes data in the read cache unit connected to the read port of the second resource module into a write cache unit connected to the write port of the first resource module, and then writes data in the write cache unit connected to the first resource module into the write port of the first resource module.

As a further technical solution, data simultaneously written by the read/write controller into write ports of a plurality of first resource modules is data read by the read/write controller from a read port of at least one another second resource module; and data read from a read port of each second resource module is written into a write port of at least one first resource module.

As a further technical solution, the resource module connected to edge module is arranged based on an array structure, a same read cache unit is connected to read ports of a plurality of resource modules located in a same column, and a same write cache unit is connected to write ports of a plurality of resource modules located in a same column; and the read/write controller simultaneously reads data from read ports of a plurality of second resource modules located in a same row, or the read/write controller simultaneously writes data into write ports of a plurality of first resource modules located in a same row.

As a further technical solution, the cache unit of the edge module is further connected to an off-chip read/write port of the FPGA, and the data read by the read/write controller from the read port of the resource module and temporarily stored in the read cache unit is transmitted to an outside of the FPGA through the off-chip read/write port, or the data written by the read/write controller into the write port of the resource module is transferred from an outside of the FPGA through the off-chip read/write port and temporarily stored in the write cache unit; and the off-chip read/write port of the FPGA is a high-speed serial port and/or a double data rate (DDR) input/output (I/O) port.

As a further technical solution, the edge module is separately connected to a plurality of off-chip read/write ports, and the read/write controller simultaneously transmits the stored data in the plurality of read cache units to an outside of the FPGA through the plurality of off-chip read/write ports respectively, or the read/write controller simultaneously writes data input from an outside of the FPGA into a plurality of write cache units through the plurality of off-chip read/write ports.

As a further technical solution, the built-in cache unit of edge module is configured in a first in first out (FIFO) memory, and a read/write speed of an off-chip read/write port for the cache unit matches a read/write speed of the read/write controller for the resource module.

As a further technical solution, the edge module further includes a read/write signal generation circuit connected to a read/write control port of the resource module, and the read/write controller generates a read/write control signal by using the read/write signal generation circuit and sends the read/write control signal to the read/write control port of the resource module, and reads the data from the read ports of the plurality of resource modules or writes the data into the write ports of the plurality of resource modules simultaneously based on the read/write control signal.

As a further technical solution, the edge module includes one read/write signal generation circuit connected to read/write control ports of all the resource modules; or the edge module includes a plurality of read/write signal generation circuits, where each of the plurality of read/write signal generation circuits is connected to a read/write control port of at least one resource module, and each of the plurality of read/write signal generation circuits sends the read/write control signal to the read/write control port of the connected resource module.

As a further technical solution, the resource module connected to the edge module is a BRAM, and a read/write control port of each BRAM includes a read address port, a read enabling port, a write address port, and a write enabling port;

the built-in read/write signal generation circuit of the edge module includes a read address generator, a read enabling generator, a write address generator, and a write enabling generator, the read address generator is connected to the read address port of the BRAM, the read enabling generator is connected to the read enabling port of the BRAM, the write address generator is connected to the write address port of the BRAM, and the write enabling generator is connected to the write enabling port of the BRAM; and the read/write control signal generated by the read/write signal generation circuit includes a read address generated by the read address generator, read enabling generated by the read enabling generator, a write address generated by the write address generator, and write enabling generated by the write enabling generator.

As a further technical solution, a plurality of BRAMs connected to the edge module form a full-chip storage array, the read/write controller in the edge module provides corresponding read enabling and write enabling for the plurality of BRAMs through the read/write signal generation circuit based on an obtained full-chip enabling signal, and the read/write controller in the edge module provides corresponding read address and write address for the plurality of BRAMs through the read/write signal generation circuit based on an obtained full-chip address signal.

Advantages

The present disclosure provides an FPGA for implementing data transmission by using a built-in edge module. The FPGA can read/write data from/into a plurality of resource modules simultaneously through a built-in edge module, achieving high-speed and high-bandwidth data transmission, and improving performance of the FPGA.

The built-in edge module not only can achieve efficient data transmission between different resource modules within an FPGA chip, but also can achieve efficient data transmission within and outside the FPGA chip. Moreover, with a relatively low implementation cost, the edge module is suitable for various applications with mass data processing.

DETAILED DESCRIPTION OF THE EMBODIMENTS

Specific implementations of the present disclosure will be further described with reference to the accompanying drawings.

Figure 1:
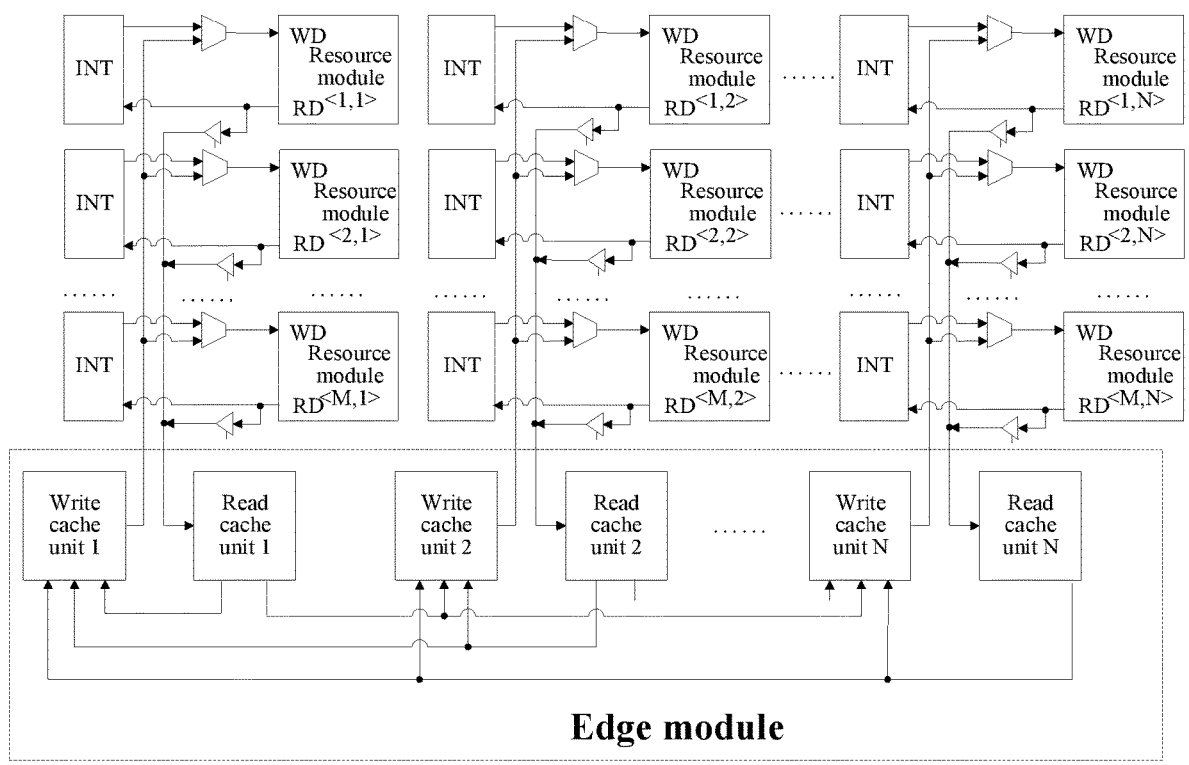
FIG. 1 is a schematic diagram of a connection between an edge module and a resource module according to an embodiment of the present disclosure.

The present disclosure provides an FPGA for implementing data transmission by using a built-in edge module. Referring to FIG. 1, like a conventional FPGA, the FPGA is provided with a large quantity of resource modules such as a CLB, a BRAM, a DSP, and an JOB, which are generally arranged based on an array structure. In addition, the FPGA is also provided with a built-in edge module based on a hardware resource, and the newly-added edge module is connected to a plurality of existing resource modules within the FPGA. Generally, the edge module is internally disposed at a bottom of an array composed of the resource modules, making a manufacturing cost low.

In the conventional FPGA, a read port RD and/or a write port WD of each resource module are/is connected to an interconnection resource module INT to connect to a winding architecture. In this way, the read port or the write port of each resource module can connect to a read port or a write port of another resource module by using the winding architecture to achieve data transmission and communication between the two resource modules. On this basis, the FPGA of the present disclosure retains a data path between the resource module and the winding architecture, and then connects the resource module to the newly-added edge module. A read port RD of one resource module is separately connected to the winding architecture and the edge module, and/or a write port WD of one resource module is separately connected to the winding architecture and the edge module. This enables the resource module to achieve data transmission and communication with another resource module by using the winding architecture or to achieve, by using the edge module, data transmission and communication with another resource module connected to the edge module. As shown in FIG. 1, the write port WD of the resource module is generally connected to the interconnection resource module INT and the edge module by using a multiplexer. That is, the write port WD of the resource module is connected to an output end of one multiplexer, one input end of the multiplexer is connected to the interconnection resource module INT, and another input end of the multiplexer is connected to the edge module. A strobing status of the multiplexer is controlled to enable the write port WD of the resource module to form a path with the interconnection resource module INT or to form a path with the edge module.

In practical implementation, for one resource module, only the read port RD is connected to the edge module, or only the write port WD is connected to the edge module. Alternatively, both the read port RD and the write port WD of the resource module are connected to the edge module, as shown in FIG. 1 to FIG. 4.

The edge module includes a read/write controller and a built-in cache unit. A connection between the resource module and the edge module is represented as follows: the read port RD and/or write port WD of the resource module are/is connected to the cache unit in the edge module, as shown in FIG. 1 to FIG. 4. FIG. 1 to FIG. 4 do not show the read/write controller in the edge module.

The read/write controller simultaneously reads data from read ports of the plurality of resource modules and temporarily stores the read data in the cache unit, or the read/write controller simultaneously writes temporarily stored data in the cache unit into write ports of the plurality of resource modules. That is, the newly-added edge module in the present disclosure can perform a read or write operation on the plurality of resource modules at a time, thereby increasing a data bit width of a single read/write operation, and achieving high-speed data transmission within a FPGA chip. For example, if each resource module has 32-bit data, according to a conventional method in which data is read from one resource module at a time, a data bit width for a single read operation is 32 bits. In the FPGA of the present disclosure, the edge module can be used to simultaneously read data from six resource modules, with a data bit width of 192 bits for a single read operation, which achieves a large data bit width for the single read operation. The same applies to a write operation.

In order to avoid mutual interference between data in read and write operations, the built-in cache unit of the edge module includes a plurality of read cache units and at least one write cache unit. Each read cache unit is connected to a read port RD of a corresponding resource module, and each write cache unit is connected to a write port WD of a corresponding resource module. The data simultaneously read by the read/write controller from the read ports of the plurality of resource modules is temporarily stored in the plurality of read cache units respectively. Each read cache unit is configured to temporarily store data read from a read port of one resource module. The data simultaneously written by the read/write controller into the write ports of the plurality of resource modules comes from at least one write cache unit. Data in each write cache unit is simultaneously written into a write port of at least one resource module.

Based on this, when both a read port RD and a write port WD of one resource module are connected to the edge module, the read/write controller can simultaneously read data from the read port of the resource module and write data into the write port of the resource module. In other words, read and write operations on a same resource module are performed simultaneously, without being affected each other.

The data simultaneously read by the read/write controller from the read ports of the plurality of resource modules needs to be temporarily stored in different read cache units. Therefore, in an embodiment, this can be always met by connecting each read cache unit to a read port of only one resource module. Alternatively, in another embodiment, in order to improve reusability of the read cache unit, one read cache unit is separately connected to read ports of a plurality of resource modules, and a read port of each of the plurality of resource modules is connected to the corresponding read cache unit by using a three-state selector. The read/write controller controls on/off of each three-state selector and reads data from one resource module connected to one read cache unit each time. The read/write controller does not simultaneously perform a read operation for a plurality of resource modules connected to a same read cache unit.

Based on an inherent characteristic that the resource module within the FPGA is arranged based on the array structure, when one read cache unit is connected to read ports RD of a plurality of resource modules, in one embodiment, a commonly used structure is that each read cache unit is separately connected to read ports RD of a plurality of resource modules located in a same column, and different read cache units are connected to resource modules in different columns, as shown in FIG. 1. When the read/write controller simultaneously reads data from read ports RD of a plurality of resource modules, the plurality of resource modules are located in different columns, and data is read for only one resource module in one column at a time. For example, in FIG. 1, the resource modules connected to the edge module form an array structure of M rows and N columns. In this case, the edge module includes N read cache units, which are denoted as read cache units 1 to N. The read cache unit 1 is connected to read ports RD of M resource modules in a first column, the read cache unit N is connected to read ports RD of M resource modules in an $N^{th}$ column, and so on. The read/write controller can perform control to read data from resource module <2,1> in the first column and a second row and temporarily store the read data in the read cache unit 1, and at the same, to read data from resource module <M, N> in the $N^{th}$ column and an Mth row and temporarily store the read data in the read cache unit N.

Regardless of whether one read cache unit is connected to one or more resource modules, when reading data from the connected resource modules each time, the read/write controller may simultaneously read data from resource modules connected to all read cache units or from resource modules connected to some read cache units. In actual implementation, the read/write controller may alternatively read data from a resource module connected to only one read cache unit. For example, in FIG. 1, assuming N=40, the read/write controller may simultaneously read data from 40 resource modules and temporarily store the read data in 40 read cache units respectively. These 40 resource modules are located in different columns. Alternatively, the read/write controller may simultaneously read data from only 20 resource modules and temporarily store the read data in 20 read cache units respectively. These 20 resource modules are located in different columns. Alternatively, the read/write controller data may read data from only one resource module in one column and temporarily store the read data in one read cache unit.

The read/write controller can write data in one write cache unit into a write port of at least one resource modules at a time, and the written data is the same. Therefore, in one embodiment, one write cache unit is only connected to a write port WD of one resource module. Alternatively, in another embodiment, one write cache unit is separately connected to write ports WD of a plurality of resource modules. Based on the characteristic that the resource module within the FPGA is arranged based on the array structure, when one write cache unit is connected to a plurality of resource modules, in one embodiment, usually, each write cache unit is separately connected to write ports WD of a plurality of resource modules located in a same column, and different write cache units are connected to resource modules in different columns, which is similar to that of the read cache unit. For example, in FIG. 1, the resource modules connected to the edge module form the array structure of M rows and N columns. In this case, the edge module includes N write cache units, which are denoted as write cache units 1 to N. The write cache unit 1 is connected to write ports WD of the M resource modules in the first column, the write cache unit N is connected to write ports WD of the M resource modules in the $N^{th}$ column, and so on. Each time, the read/write controller writes data in one write cache unit into write ports of all resource modules connected to the write cache unit or into write ports of some resource modules connected to the write cache unit. For example, in FIG. 1, data in the write cache unit 1 may be simultaneously written into all the M resource modules in the first column or into five resource modules in the first column.

When the edge module includes a plurality of write cache units, in one embodiment, the read/write controller simultaneously writes data in all the write cache units into their respective connected resource modules. For example, in FIG. 1, the edge module includes the N write cache units, and the read/write controller writes data in the N write cache units into N columns of resource modules respectively. Data in each write cache unit can be written into at least one resource module in a same column. For example, the data in the write cache unit 1 can be written into a resource module in the first column and a fifth row and a resource module in the first column and a tenth row. In addition, data in the write cache unit 2 can be written into a resource module in a first row and a second column and a resource module in the second row and the second column, . . . , and data in the write cache unit N can be written into all the M resource modules in the $N^{th}$ column.

Alternatively, in another embodiment, the read/write controller simultaneously writes data in some write cache units into write ports WD of resource modules respectively connected to these write cache units. For example, in FIG. 1, the read/write controller only writes the data in the write cache unit 1 into resource modules in the first column and the data in the write cache unit 2 into resource modules in the second column, without writing data into resource modules in other columns.

In an embodiment, each built-in read cache unit of the edge module is separately connected to the write cache units. For example, in FIG. 1, the read cache unit 1 is separately connected to the N write cache units, the read cache unit 2 is separately connected to the N write cache units, and so on. In this way, data in any read cache unit can be written into any write cache unit. Based on this structure, data written by the read/write controller into a write port of any first resource module is data read by the read/write controller from a read port of another second resource module. When this function is implemented, the read/write controller first reads the data from the read port of the second resource module and temporarily stores the read data in a read cache unit connected to the read port of the second resource module. Then the read/write controller writes data in the read cache unit connected to the read port of the second resource module into a write cache unit connected to the write port of the first resource module, and then writes data in the write cache unit connected to the write port of the first resource module into the write port of the first resource module. In this scenario, the first resource module and the second resource module may be located in a same column or in different columns. The edge module can be used to achieve data transmission between the first and second resource modules at any positions. It should be noted that in embodiments of FIG. 2 to FIG. 4, a relationship similar to the relationship in this embodiment also exists between the read cache unit and the write cache unit, but is not shown in FIG. 2 to FIG. 4 for simplification.

For example, in FIG. 1, the first resource module is resource module <15,10> located in a $15^{th}$ row and a tenth column, and the second resource module is resource module <25,10> located in a $25^{th}$ row and the tenth column. In this case, the read/write controller reads data from a read port RD of the resource module <25,10> and temporarily stores the read data in the read cache unit 10. Then the read/write controller writes data in the read cache unit 10 into the write cache unit 10, and then writes data in the write cache unit 10 into a write port WD of the resource module <15,10>.

For another example, in FIG. 1, the first resource module is the resource module <15,10> located in the $15^{th}$ row and the tenth column, and the second resource module is resource module <17,1> located in a $17^{th}$ row and the first column. In this case, the read/write controller reads data from a read port RD of the resource module <17,1> and temporarily stores the read data in the read cache unit 1. Then the read/write controller writes data in the read cache unit 1 into the write cache unit 10, and then writes the data in the write cache unit 10 into the write port WD of the resource module <15,10>.

Based on this, data simultaneously written by the read/write controller into write ports of a plurality of first resource modules is data read by the read/write controller from a read port of at least one another second resource module; and data read from a read port of each second resource module is written into a write port of at least one first resource module. When data read from a read port of one second resource module is written into write ports of a plurality of first resource modules, the write ports of the plurality of first resource modules may be connected to a same write cache unit or different write cache units. A specific implementation process is the same as that in the above embodiment.

For example, in FIG. 1, the second resource module is the resource module <17,1> located in the $17^{th}$ row and the first column, and the plurality of first resource modules include the resource module <15,10> located in the $15^{th}$ row and the tenth column, resource module <16,10> located in a $16^{th}$ row and the tenth column, and resource module <17,10> located in the $17^{th}$ row and the tenth column. In this case, the read/write controller reads the data from the read port RD of the resource module <17,1> and temporarily stores the read data in the read cache unit 1. Then the read/write controller writes the data in the read cache unit 1 into the write cache unit 10, and then simultaneously writes the data in the write cache unit 10 into write ports of the resource module <15,10>, the resource module <16,10>, and the resource module <17,10>. In this embodiment, the data read from the resource module <17,1> is written into all the three first resource modules, and the three first resource modules are connected to the same write cache unit 10.

For another example, in FIG. 1, the second resource module is the resource module <17,1> located in the $17^{th}$ row and the first column, and the plurality of first resource modules include the resource module <15,10> located in the $15^{th}$ row and the tenth column, the resource module <16,10> located in the $16^{th}$ row and the tenth column, and resource module <2,2> located in the second row and the second column. In this case, the read/write controller reads the data from the read port RD of the resource module <17,1> and temporarily stores the read data in the read cache unit 1. Then the read/write controller writes the data in the read cache unit 1 into the write cache unit 10 and the write cache unit 2, and then simultaneously writes the data in the write cache unit 10 into write ports of the resource module <15,10> and the resource module <16,10>, and simultaneously writes the data in the write cache unit 2 into a write port of the resource module <2,2>. In this example, the data read from the resource module <17,1> is written into all the three first resource modules, and the three first resource modules are connected to different write cache units.

For still another example, in FIG. 1, the second resource modules include the resource module <17,1> located in the $17^{th}$ row and the first column and resource module <17,2> located in the $17^{th}$ row and the second column. The first resource modules include resource module <19,1> located in a $19^{th}$ row and the first column and resource module <19,2> located in the $19^{th}$ row and the second column.

The read/write controller reads the data from the read port RD of the resource module <17,1> and temporarily store the read data in the read cache unit 1, and reads data from a read port RD of the resource module <17,2> and temporarily stores the read data in the read cache unit 2. Then the read/write controller writes the data in the read cache unit 1 into the write cache unit 1 and writes data in the read cache unit 2 into the write cache unit 2. Then the read/write controller writes the data in the write cache unit 1 into the resource module <19,1> and the data in the write cache unit 2 into the resource module <19,2> simultaneously. In this example, data is simultaneously written into two first resource modules, and the written data comes from different second resource modules.

In another embodiment, the read/write controller simultaneously reads data from read ports of a plurality of second resource modules located in a same row, or the read/write controller simultaneously writes data into write ports of a plurality of first resource modules located in a same row. That is, the edge module can be used to read an entire row of data from the resource module in the array structure, and then write the entire row of data into another row. The read/write process implemented in this embodiment is of very important practical application significance.

Based on the various embodiments mentioned above, efficient data transmission can be achieved within the FPGA. In addition, referring to FIG. 2, the cache unit of the edge module is further connected to an off-chip read/write port of the FPGA, and the data read by the read/write controller from the read port of the resource module and temporarily stored in the read cache unit is transmitted to an outside of the FPGA through the off-chip read/write port. In this way, data of a resource module at a specific location in the FPGA can be read and transmitted to the outside of the FPGA. Alternatively, the data written by the read/write controller into the write port of the resource module is transferred from an outside of the FPGA through the off-chip read/write port and temporarily stored in the write cache unit. In this way, data outside the FPGA can be written into a resource module at a specification location in the FPGA.

Figure 2:
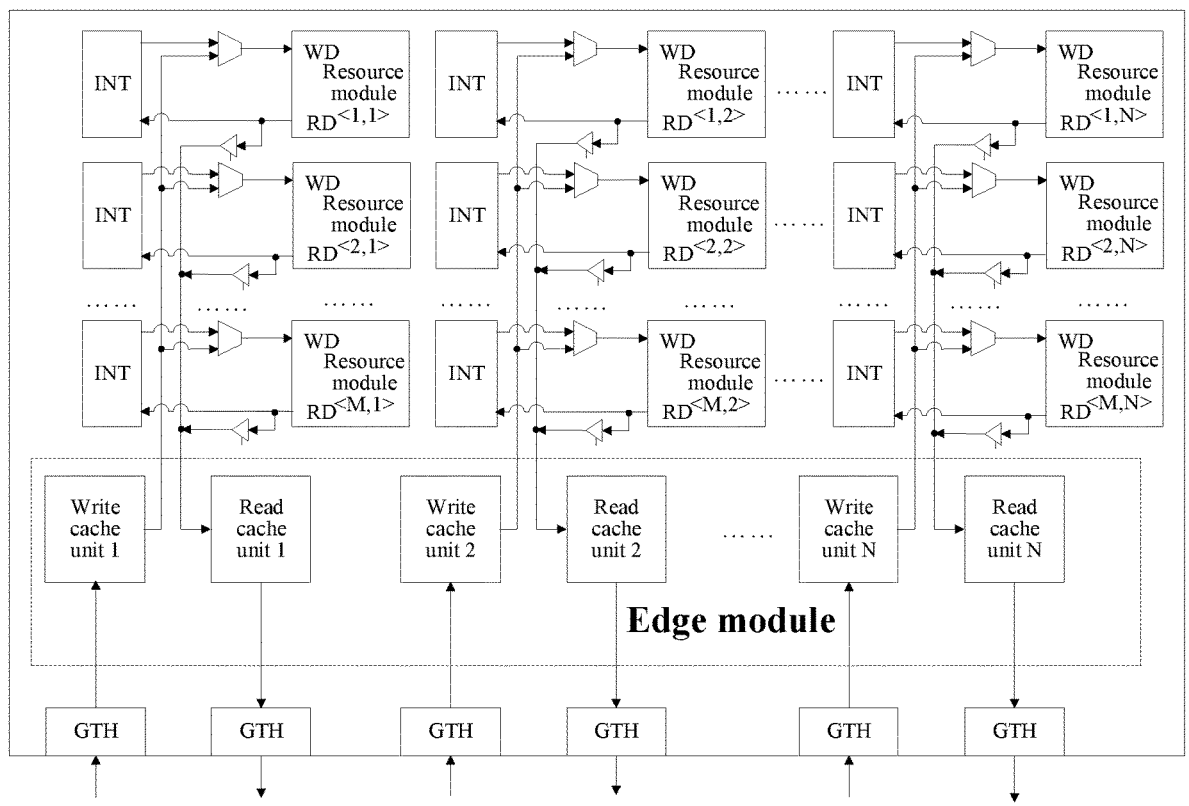
FIG. 2 is a schematic diagram of a connection between an edge module and each of a resource module and an off-chip read/write port according to an embodiment of the present disclosure.

The off-chip read/write port of the FPGA is a high-speed serial port and/or a DDR I/O port. In FIG. 2, an example in which the high-speed serial port is a high-speed transceiver GTH is used. In addition, the edge module is separately connected to a plurality of off-chip read/write ports. The read/write controller simultaneously transmits the stored data in the plurality of read cache units to the outside of the FPGA through the plurality of off-chip read/write ports respectively, or the read/write controller simultaneously writes data input from the outside of the FPGA into a plurality of write cache units through the plurality of off-chip read/write ports, thereby achieving large-bandwidth data transmission within and outside the FPGA. For example, in FIG. 2, each write cache unit is connected to one GTH, and each read cache unit is connected to one GTH. In this embodiment, the built-in cache unit of the edge module is configured in a FIFO memory, such that a read/write speed of an off-chip read/write port for the cache unit matches a read/write speed of the read/write controller for the resource module.

The resource modules connected to the edge module in the present disclosure may be various resource modules within the FPGA. For certain types of resource modules, it is often necessary to provide a read/write control signal for read/write control ports of these resource modules when performing read and write operations on these resource modules. For example, for a BRAM, it is necessary to provide a read address and read enabling, or provide a write address and write enabling. Therefore, in an embodiment, the edge module further includes a read/write signal generation circuit connected to a read/write control port of the resource module. The read/write controller generates the read/write control signal by using the read/write signal generation circuit and sends the read/write control signal to the read/write control port of the resource module, and reads the data from the read ports RD of the plurality of resource modules or writes the data into the write ports WD of the plurality of resource modules simultaneously based on the read/write control signal.

In an embodiment, all the resource modules connected to the edge module share one read/write signal generation circuit, and the read/write signal generation circuit is connected to read/write control ports of all the resource modules. Alternatively, the edge module includes a plurality of read/write signal generation circuits, where each of the plurality of read/write signal generation circuits is connected to a read/write control port of at least one resource module, and each of the plurality of read/write signal generation circuits sends the read/write control signal to the read/write control port of the connected resource module. Based on the array architecture of the resource module, in an embodiment, according to a common method, the edge module includes a plurality of read/write signal generation circuits, where each of the plurality of read/write signal generation circuits corresponds to a column of resource modules, and each of the plurality of read/write signal generation circuits is connected to read/write control ports of a plurality of resource modules located in a same column.

The present disclosure mainly uses the edge module to simultaneously perform read and write operations on the plurality of resource modules to improve data transmission efficiency. Therefore, the resource module connected to the edge module is usually a resource module with a large data transmission demand, such as the BRAM, a register, or a signal point. In an embodiment, it is quite common that the resource module connected to the edge module within the FPGA is the BRAM, and therefore a plurality of BRAMs can be read and written simultaneously by using the edge module.

Figure 3:
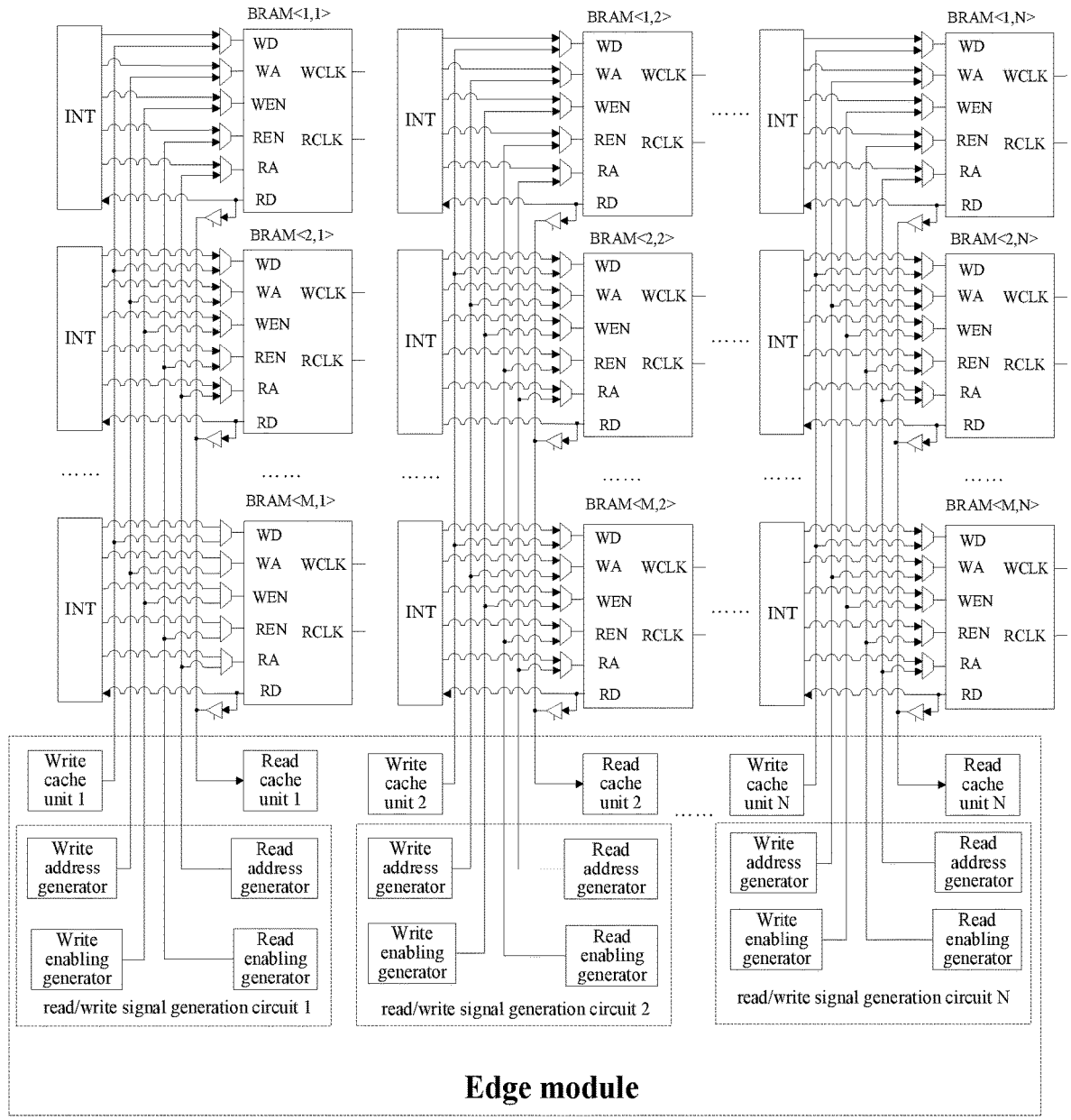
FIG. 3 is a schematic diagram of a connection between an edge module and a BRAM according to an embodiment of the present disclosure.
Figure 4:
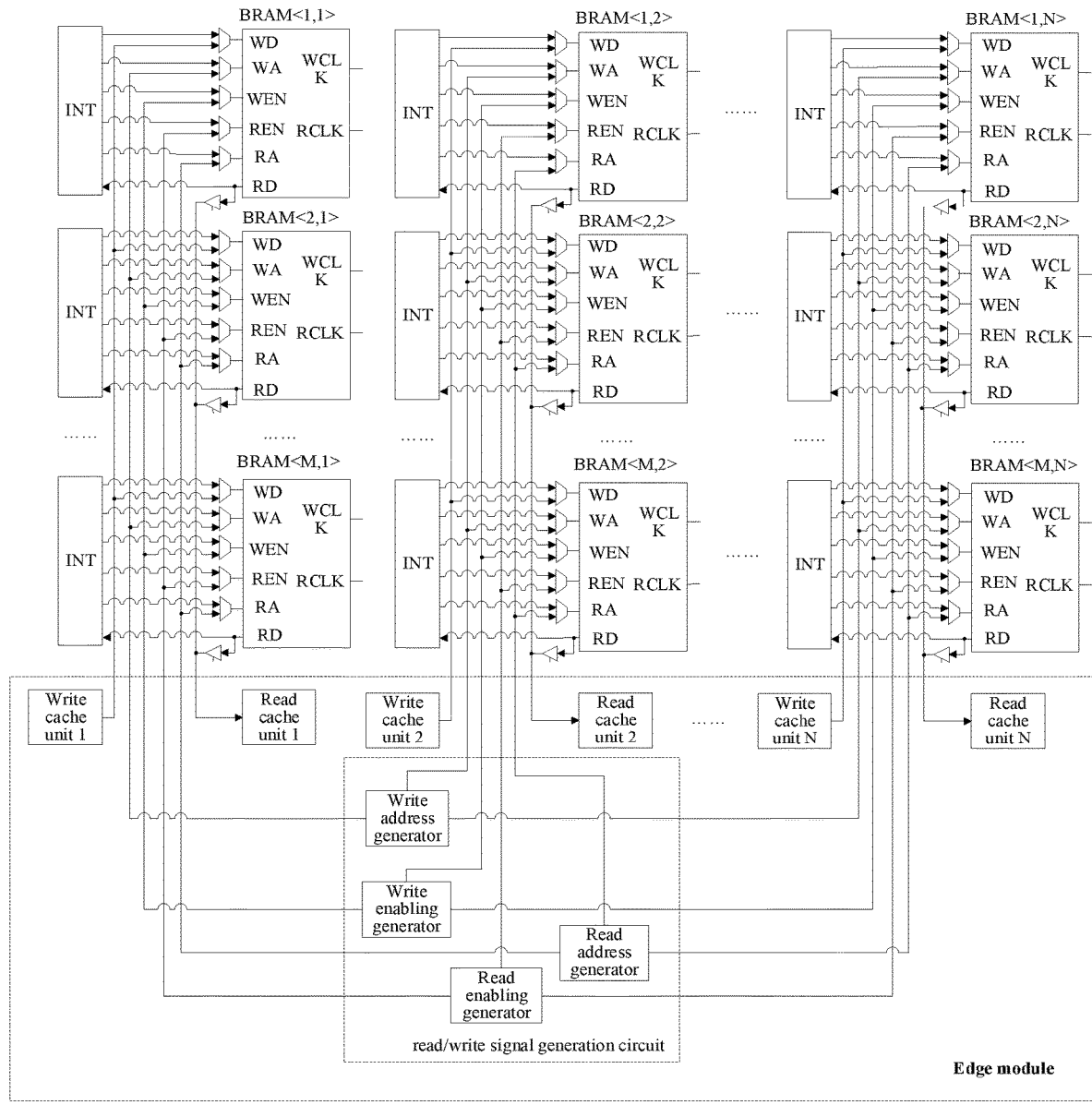
FIG. 4 is a schematic diagram of a connection between an edge module and a BRAM according to another embodiment of the present disclosure.

A read/write control port of each BRAM includes a read address port WA, a read enabling port WEN, a write address port RA, and a write enabling port REN. Therefore, when the resource module connected to the edge module is the BRAM, each built-in read/write signal generation circuit of the edge module includes a read address generator, a read enabling generator, a write address generator, and a write enabling generator. The read address generator is connected to the read address port WA of the BRAM, the read enabling generator is connected to the read enabling port WEN of the BRAM, the write address generator is connected to the write address port RA of the BRAM, and the write enabling generator is connected to the write enabling port REN of the BRAM. In an embodiment, a circuit structure when each read/write signal generation circuit is connected to a column of BRAMs is shown in FIG. 3. When the resource modules form the array structure of M rows and N columns, the edge module includes read/write signal generation circuits 1 to N, which are respectively configured to connect N columns of resource modules. In another embodiment, the read/write signal generation circuit is connected to all BRAMs, and a corresponding circuit structure is shown in FIG. 4.

In this case, the read/write control signal generated by each read/write signal generation circuit includes a read address generated by the read address generator, read enabling generated by the read enabling generator, a write address generated by the write address generator, and write enabling generated by the write enabling generator. The edge module provides effective-level read enabling and a read address for a specific BRAM by using the read/write signal generation circuit, and the read/write controller reads data in the read address from a read port RD of the read-enabled BRAM. Alternatively, the edge module provides effective-level write enabling and a write address for a specific BRAM by using the read/write signal generation circuit, and the read/write controller writes data into the write address of a write port WD of the write-enabled BRAM. Based on a structure in which read ports RD of BRAMs in a same column are all connected to a same read cache unit, only one BRAM module in each column receives the effective-level read enabling at a time. However, a plurality of BRAMs in a same column can receive the effective-level write enabling, such that same data is written into the plurality of BRAMs. Read and write operations on a same BRAM are independent, and a same BRAM module can be read enabled and write enabled simultaneously.

A plurality of BRAMs connected to the edge module can form a full-chip storage array. The read/write controller in the edge module reads and writes the full-chip storage array based on an obtained full-chip enabling signal and full-chip address signal. In other words, the read/write controller in the edge module provides corresponding read enabling and write enabling for the plurality of BRAMs through the read/write signal generation circuit based on the obtained full-chip enabling signal, and the read/write controller in the edge module provides corresponding read address and write address for the plurality of BRAMs through the read/write signal generation circuit based on the obtained full-chip address signal.

What is claimed is:

1. A field programmable gate array (FPGA) for implementing a data transmission by using a built-in edge module, wherein the FPGA is provided with the built-in edge module, wherein the built-in edge module is connected to a plurality of resource modules within the FPGA, wherein a read port of each of the plurality of resource modules is separately connected to a winding architecture and the edge module, and/or a write port of each of the plurality of resource modules is separately connected to the winding architecture and the edge module; and
the edge module comprises a read/write controller and a built-in cache unit, wherein the read/write controller simultaneously reads data from read ports of the plurality of resource modules and temporarily stores the data in the cache unit, or the read/write controller simultaneously writes the data temporarily stored in the cache unit into write ports of the plurality of resource modules.

2. The FPGA according to claim 1, wherein the built-in cache unit of the edge module comprises a plurality of read cache units and at least one write cache unit, wherein the data simultaneously read by the read/write controller from the read ports of the plurality of resource modules is temporarily stored in the plurality of read cache units respectively, and each of the plurality of read cache units is configured to temporarily store data read from a read port of one resource module; and
the data simultaneously written by the read/write controller into the write ports of the plurality of resource modules comes from the at least one write cache unit, and data in each of the at least one write cache unit is simultaneously written into a write port of at least one resource module.

3. The FPGA according to claim 2, wherein each of the plurality of resource modules is connected to the edge module and has a read port and a write port, and the read/write controller simultaneously reads the data from the read port of the one resource module and writes the data into a write port of the one resource module.

4. The FPGA according to claim 2, wherein each of the plurality of built-in read cache units of the edge module is separately connected to read ports of a plurality of resource modules, a read port of each of the plurality of resource modules is connected to the corresponding read cache unit by using a three-state selector, and the read/write controller controls on/off of each three-state selector and reads data from a read port of one of the plurality of resource modules connected to the read cache unit each time; and
each of the at least one built-in write cache unit of the edge module is separately connected to write ports of a plurality of resource modules, and the read/write controller writes data in one write cache unit into write ports of all connected resource modules or into write ports of some connected resource modules each time.

5. The FPGA according to claim 2, wherein each of the plurality of built-in read cache units of the edge module is separately connected to the at least one write cache unit,
  data written by the read/write controller into a write port of a first resource module is data read by the read/write controller from a read port of a second resource module,
  the read/write controller reads the data from the read port of the second resource module and temporarily stores the read data in a read cache unit connected to the read port of the second resource module, and
  the read/write controller writes data in the read cache unit connected to the read port of the second resource module into a write cache unit connected to the write port of the first resource module, and writes data in the write cache unit connected to the first resource module into the write port of the first resource module.

6. The FPGA according to claim 5, wherein data simultaneously written by the read/write controller into write ports of a plurality of first resource modules is data read by the read/write controller from a read port of at least one second resource module; and data read from a read port of each second resource module is written into a write port of at least one first resource module.

7. The FPGA according to claim 6, wherein each of the plurality of resource modules is connected to the edge module and is arranged based on an array structure, a same read cache unit is connected to read ports of a plurality of resource modules located in a same column, and a same write cache unit is connected to write ports of a plurality of resource modules located in a same column; and
  the read/write controller simultaneously reads data from read ports of a plurality of second resource modules located in a same row, or the read/write controller simultaneously writes data into write ports of a plurality of first resource modules located in a same row.

8. The FPGA according to claim 2, wherein the cache unit of the edge module is further connected to an off-chip read/write port of the FPGA, and the data read by the read/write controller from the read port of the resource module and temporarily stored in the read cache unit is transmitted to an outside of the FPGA through the off-chip read/write port, or the data written by the read/write controller into the write port of the resource module is transferred from the outside of the FPGA through the off-chip read/write port and temporarily stored in the at least one write cache unit; and
  the off-chip read/write port of the FPGA is a high-speed serial port and/or a double data rate (DDR) input/output (I/O) port.

9. The FPGA according to claim 7, wherein the edge module is simultaneously connected to a plurality of off-chip read/write ports, and the read/write controller simultaneously transmits the data temporarily stored in the plurality of read cache units to an outside of the FPGA through the plurality of off-chip read/write ports respectively, or the read/write controller simultaneously writes data input from the outside of the FPGA into a plurality of write cache units through the plurality of off-chip read/write ports.

10. The FPGA according to claim 7, wherein the built-in cache unit of the edge module is configured in a first in first out (FIFO) memory, and a read/write speed of an off-chip read/write port for the cache unit matches a read/write speed of the read/write controller for the resource module.

11. The FPGA according to claim 2, wherein the edge module further comprises a read/write signal generation circuit connected to a read/write control port of the resource module, and the read/write controller generates a read/write control signal by using the read/write signal generation circuit and sends the read/write control signal to the read/write control port of the resource module, and reads the data from the read ports of the plurality of resource modules or writes the data into the write ports of the plurality of resource modules simultaneously based on the read/write control signal.

12. The FPGA according to claim 11, wherein the edge module comprises one read/write signal generation circuit connected to read/write control ports of all the resource modules; or the edge module comprises a plurality of read/write signal generation circuits, wherein each of the plurality of read/write signal generation circuits is connected to a read/write control port of at least one resource module, and each of the plurality of read/write signal generation circuits sends the read/write control signal to the read/write control port of the connected resource module.

13. The FPGA according to claim 11, wherein each of the plurality of resource modules is connected to the edge module and is a block random access memory (BRAM), and a read/write control port of each BRAM comprises a read address port, a read enabling port, a write address port, and a write enabling port;
  the built-in read/write signal generation circuit of the edge module comprises a read address generator, a read enabling generator, a write address generator, and a write enabling generator, the read address generator is connected to the read address port of the BRAM, the read enabling generator is connected to the read enabling port of the BRAM, the write address generator is connected to the write address port of the BRAM, and the write enabling generator is connected to the write enabling port of the BRAM; and
  the read/write control signal generated by the read/write signal generation circuit comprises a read address generated by the read address generator, read enabling generated by the read enabling generator, a write address generated by the write address generator, and write enabling generated by the write enabling generator.

14. The FPGA according to claim 13, wherein a plurality of BRAMs connected to the edge module form a full-chip storage array, the read/write controller in the edge module provides corresponding read enabling and write enabling for the plurality of BRAMs through the read/write signal generation circuit based on an obtained full-chip enabling signal, and the read/write controller in the edge module provides corresponding read address and write address for the plurality of BRAMs through the read/write signal generation circuit based on an obtained full-chip address signal.

* * * * *